United States Patent [19]

Lehureau et al.

[11] Patent Number: 5,218,595
[45] Date of Patent: Jun. 8, 1993

[54] DEVICE FOR READING OBLONG SEGMENTS OF AN ADVANCING STORAGE MEDIUM

[75] Inventors: Jean-Claude Lehureau, Ste Geneviève des bois; Sophie Neubert, Les Ulis, both of France

[73] Assignee: Thomson-CSF, Puteaux, France

[21] Appl. No.: 643,520

[22] Filed: Jan. 18, 1991

[30] Foreign Application Priority Data

Jan. 18, 1990 [FR] France ................................ 90 00546

[51] Int. Cl.⁵ .............................................. G11B 7/00
[52] U.S. Cl. ...................................... 369/112; 369/110
[58] Field of Search .......................... 369/110, 112, 120

[56] References Cited

U.S. PATENT DOCUMENTS

| | | | |
|---|---|---|---|
| 3,913,076 | 10/1975 | Lehureau et al. | 369/112 |
| 4,551,827 | 11/1985 | Custer et al. | 369/120 |
| 4,771,414 | 9/1988 | Yoshimatsu | 369/110 |
| 4,835,380 | 5/1989 | Opheij et al. | 359/731 |
| 4,959,824 | 9/1990 | Ueda et al. | 369/112 |
| 4,974,219 | 11/1990 | Korth | 369/110 |

FOREIGN PATENT DOCUMENTS

| | | |
|---|---|---|
| 92420 | 10/1983 | European Pat. Off. . |
| 94852 | 11/1983 | European Pat. Off. . |
| 2025731 | 1/1980 | United Kingdom . |
| 2120001 | 11/1983 | United Kingdom . |
| 8101217 | 4/1981 | World Int. Prop. O. . |

*Primary Examiner*—Bruce C. Anderson
*Attorney, Agent, or Firm*—Oblon, Spivak, McClelland, Maier & Neustadt

[57] ABSTRACT

A device for reading data from a multitrack magnetic tape or other storage media. The reading device includes an imaging device having a convex mirror and a concave mirror arranged to produce a magnification equal to $-1$. The device also includes a light source, a cylindrical lens and a detector device. The device is of compact dimensions, yet exhibits only slight aberrations and provides high resolution.

7 Claims, 2 Drawing Sheets

DEVICE FOR READING OBLONG SEGMENTS OF AN ADVANCING STORAGE MEDIUM

This invention relates to a device for reading oblong segments of an advancing storage medium. It can be applied, for example, in a video recorder for multitrack tapes which includes a magnetooptical read head.

BACKGROUND OF THE RELATED ART

Reading of magnetic tapes is now performed by read heads either of the magnetic type or of the magnetooptical type. The magnetic heads are generally suitable only for reading magnetic tapes with high advancing speed, while the heads of the magnetooptical type are suitable for low advancing speeds of these magnetic tapes.

It is known to pick up the data provided by the transducer (in general a garnet) of such a magnetooptical head by sending a light ray to this transducer and by analyzing the reflected ray with the help of a photoelectric sensor. The optical part of such a sensor system is bulky and is not suitable for multitrack heads whose zone to be read has an oblong shape.

SUMMARY OF THE INVENTION

This invention has as its object a device for reading oblong segments of an advancing storage medium, a device which is the most compact possible and exhibits the fewest possible optical aberrations and a high resolution (about 1 micron in the direction of the width of the oblong segment).

The reading device according to the invention comprises a polarized light source which is focussed to illuminate the oblong zone to be read, a catoptric imagery device with concentric concave and convex spherical mirrors, and a detector device whose shape and dimensions of the useful surface are approximately the same as those of the segment to be read.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The invention is described below in reference to the reading of tracks of a multitrack magnetic tape, but, of course, it is not limited to such an application and can be used for the dynamic reading of data recorded on various storage media in relative displacement in relation to the reading device, for example for the reading of movies in a telecinema system (transformation to video signals) or for the reading of various codes (optical codes such as bar codes or codes with software points or instructions for computers) printed on opaque or transparent tapes, etc.

Figure 1:
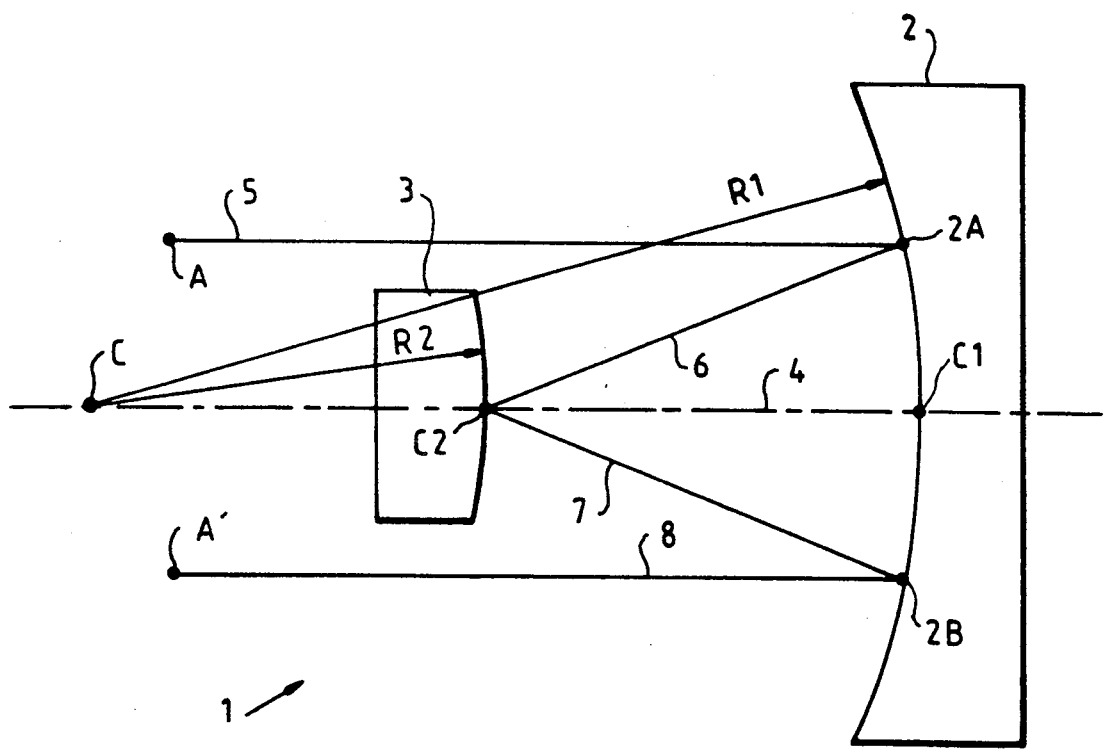
FIG. 1 is a diagram of the catoptric imagery device used by the invention.

Referring now to the drawings, wherein like reference numerals designate identical or corresponding parts throughout the several views, and more particularly to FIG. 1 thereof, the simplified diagram of catoptric imagery device 1 used in the reading device of the invention has been shown. Device 1 essentially comprises two concentric spherical mirrors 2 and 3. Mirror 2 is concave and mirror 3 is convex and of a smaller opening diameter than mirror 2. Radius R2 of mirror 3 is preferably equal to one-half of the radius R1 of mirror 2. Mirrors 2 and 3 are placed so that the common center C is aligned with respective vertices C1, C2 of their mirror surfaces and located on these surfaces. Straight line 4 passing through C, C1, C2 is thus the common optical axis of mirrors 2, 3. In an embodiment of the invention, R1 is about 20 mm.

The object or the surface to be imaged by device 1 is placed at a point A offset relative to axis 4 so that a light ray 5 coming from A and parallel to axis 4 is not hidden from view by mirror 2 and can be reflected by mirror 2. This offsetting is, in this example (R1=about 20 mm, diameter of the mirror 2=20 mm and diameter of mirror 3=8 mm), about 6 to 7 mm.

After reflection by 2A on the mirror of ray 5, reflected ray 6 arrives at center C2 of mirror 3. Reflected ray 7 coming from C2 is reflected by 2B, on mirror 2, and provides an emergent ray 8 which is symmetrical to ray 5 relative to axis 4.

The photoelectric sensor in A' which is symmetrical with A relative to axis 4 is used.

If said relation $R1=2 \cdot R2$ is met, imagery device 1 is stigmatic. Its magnification is equal to $-1$ whatever the distance of A to mirror 2 may be, and its resolution is limited by the diameter of mirror 3 acting as a diaphragm.

Figure 2:
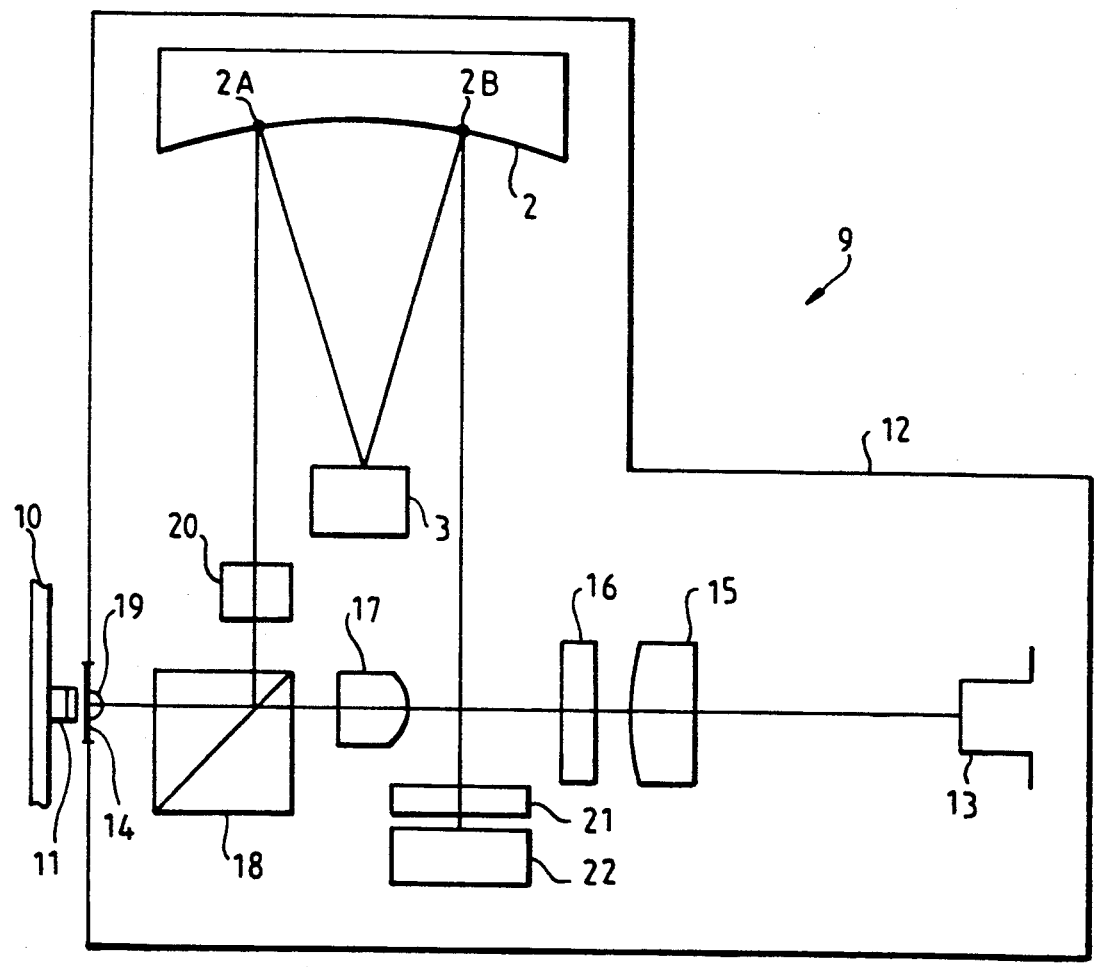
FIG. 2 is a diagram of an embodiment of the reading device according to the invention.

In FIG. 2, an embodiment of a reading device 9 of magnetic tape 10, incorporating imagery device 1, is shown. This device 9 is placed against a magnetooptical transducer 11 or close to the latter. Transducer 11 is of any suitable type (using in particular the Faraday effect and/or the Kerr effect). The angle of incidence of the rays sent by transducer 11 can be a function of the magnetooptical effect used. In the example shown in FIG. 2, reading device 9 is placed in a housing 12 having, in axial section, an "L" shape, but, of course, the housing 12 can have any shape. Inside housing 12, near one of its ends, a light source 13 is placed in the axis of a branch of the "L." This source 13 is, for example, a polarized laser diode. The wavelength of its radiation is, for example, about 750 to 800 nm. The radiation coming from source 13 is directed, along the axis of the branch of the "L" in which this source is placed, toward a window 14 formed or inserted in the wall of housing 12 opposite source 13.

Window 14 is, of course, of a transparent material for the wavelength used, and magnetooptical transducer 11 is close to this window.

The radiation coming from source 13 respectively goes through a spherical collimation lens 15, if necessary (if source 13 is not polarized) a polarizer 16, a cylindrical focussing lens 17, a separating cube 18 (or a plate with parallel faces placed at 45°), and a cylindrical microlens 19 attached to window 14. Microlens 19 is not essential for all uses of the invention. According to a preferred embodiment, however, microlens 19 is made from an optical fiber section of a length of about 10 to 20 mm, split along a plane passing through its axis. The radius of the optical fiber used is preferably less than about 20 microns.

Device 9 and transducer 11 are placed so that the rays reflected by the transducer pass through microlens 19 and are directed by separator 18 to mirror 2. On the path of the rays, between separator 18 and mirror 2, a cylindrical lens 20 is placed for astigmatism correction. The rays coming from mirror 2 after reflection on mirror 3 are collected by an analyzer 21 and a detector 22 which is achieved, for example, with the help of a CCD bar. Detector 22 is placed in such a way that the distance between its sensitive surface and point 2B of mirror 2 is equal to the distance between the reflection surface of transducer 11 and point 2A of mirror 2. Of course, the paths between, on the one hand, source 13 and lens 19, and on the other hand, mirror 2 and detector 22, cannot be rectilinear, and mirrors can be placed on these paths also to reduce the overall dimensions of the reading device.

The positioning and the radius of curvature of microlens 19 are determined to increase the resolution in the direction perpendicular to the length of the lens. Its longitudinal axis is parallel to the axis of the oblong zone to be read. This lens 19 creates the astigmatism since the virtual image that it produces is more distant according to its width than according to its length. The astigmatism correction is achieved by the cylindrical lens 20, which can be of low power (focal distance of about 300 mm, for example). If this lens 20 is divergent, its actual direction is the same as that of microlens 19. If it is convergent, its actual direction is perpendicular to that of the microlens.

If the influence of the offsetting of rays 5 and 8 (FIG. 1) is disregarded, it can be demonstrated that imagery device 1 is without aberrations. The stigmatism condition being achieved, the spherical aberration is zero and the system does not exhibit an astigmatism. Strictly speaking, the slight aberrations affecting this imagery device are due to the above-mentioned offsetting, which creates the astigmatism.

A calculation by spot diagram of the reading device described above shows that a line of 10 mm with a distortion of 0.1% and a field curvature less than 300 microns can be imaged. Radius R1 of mirror 2 can then be about 20 mm. The calculation by spot diagram also shows that an offset of mirror 3 relative to mirror 2 on the order of 300 microns produces a distortion of 0.2% on a field of 10 mm. A divergence of positioning on optical axis 4 of mirror 3 of 500 microns produces a distortion of the image on the order of 0.2%. These calculations show that the positioning tolerance of the mirrors is compatible with mechanical tolerances able to be maintained.

For the above-mentioned application to the reading of multitrack magnetic tapes with the help of a magnetooptical transducer, the object or the zone to be imaged can be considered as a dephasing network. The polarization of the beam reflected by this object rotates at an angle of $\pm\phi$ according to the magnetization of the tape. The device described above makes it possible to display this polarization variation. The laser diode, constituting source 13 in this example, is oriented so that the small axis of the beam that it produces is oriented parallel to the large direction of microlens 19. In the case where the source is not polarized, and where polarizer 16 is therefore used, the polarizer makes it possible to avoid the possible fluctuations of the polarization of source 13. The polarization of the beam reaching microlens 19 is perpendicular to its longitudinal axis. Analyzer 21 is oriented at 45°, for example, relative to the direction of the rays and makes it possible to detect the modulation due to the magnetization variations of the tape being read. Analyzing device 21 can be replaced by a polarizer oriented at 45° and a polarization separating cube.

What is claimed as new and desired to be secured by letters patent of the United States is:

1. A device for reading an oblong zone of an advancing storage medium, comprising:
   a polarized light source focused to illuminate the oblong zone to be read with an illumination beam;
   a transducer reflecting said illumination beam along a first axis back toward said light source as an information-carrying beam;
   a separating cube located along said first axis for separating said image-carrying beam from said incident beam and redirecting said information-carrying beam along a second axis;
   a catoptric imagery device with a concentric concave spherical mirror and a convex spherical mirror, said concave spherical mirror intercepting said information-carrying beam along said second axis and redirecting said information-carrying beam to said convex spherical mirror, said convex spherical mirror being located so as to direct said information-carrying beam back to said concave spherical mirror; and
   a detector device receiving said information-carrying beam from said concave spherical mirror and having a useful surface whose shape and dimensions are approximately the same as the shape and dimensions of the oblong zone to be read.

2. The device according to claim 1, wherein the catoptric imagery device has a magnification of $-1$ and wherein the ratio of the radii of the convex mirror and the concave mirror is $\frac{1}{2}$.

3. The device according to claim 1, further comprising a cylindrical lens for focusing light emitted from the polarized light source.

4. The device according to claim 1, further comprising an illumination beam output and a cylindrical microlens at said illumination beam output.

5. The device according to claim 4, wherein said device further comprises a lens for astigmatism correction on the path of the reflected information-carrying beam.

6. The device according to claim 1, wherein an object to be imaged is the reflecting surface of a magnetooptical transducer with a multitrack magnetic tape read head, and redirecting said information-carrying beam along a second axis;
   a catoptric imagery device with a concentric concave spherical mirror and a convex spherical mirror, said concave spherical mirror intercepting said information-carrying beam along said second axis and redirecting said information-carrying beam to said convex spherical mirror, said convex spherical mirror being located so as to direct said information-carrying beam back to said concave spherical mirror; and
   a detector device receiving said information-carrying beam from said concave spherical mirror and having a useful surface whose surface and dimensions are approximately the same as the shape and dimensions of the oblong zone to be read.

7. The device according to claim 1, wherein an object to be imaged is the surface of a film used in a telecinema system.

* * * * *